No. 892,705. PATENTED JULY 7, 1908.
J. W. BILLINGS.
EGG TESTER.
APPLICATION FILED MAR. 23, 1907.
2 SHEETS—SHEET 1.
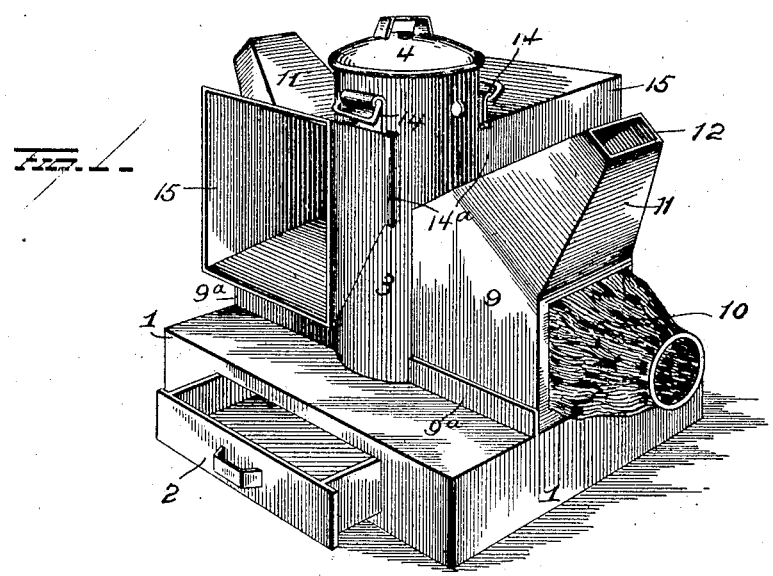
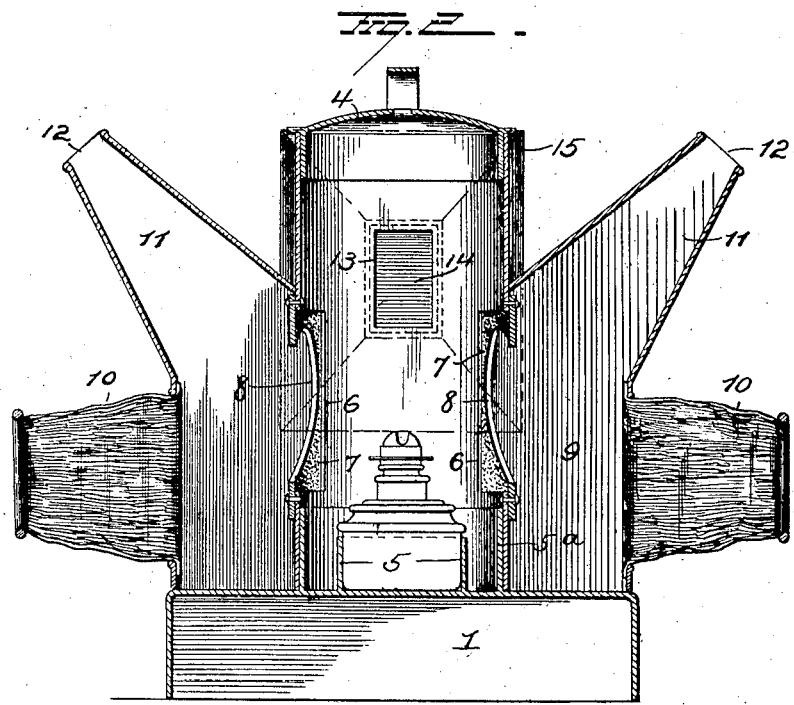
WITNESSES
INVENTOR
Attorney No. 892,705. PATENTED JULY 7, 1908.
J. W. BILLINGS.
EGG TESTER.
APPLICATION FILED MAR. 23, 1907.
2 SHEETS—SHEET 2.
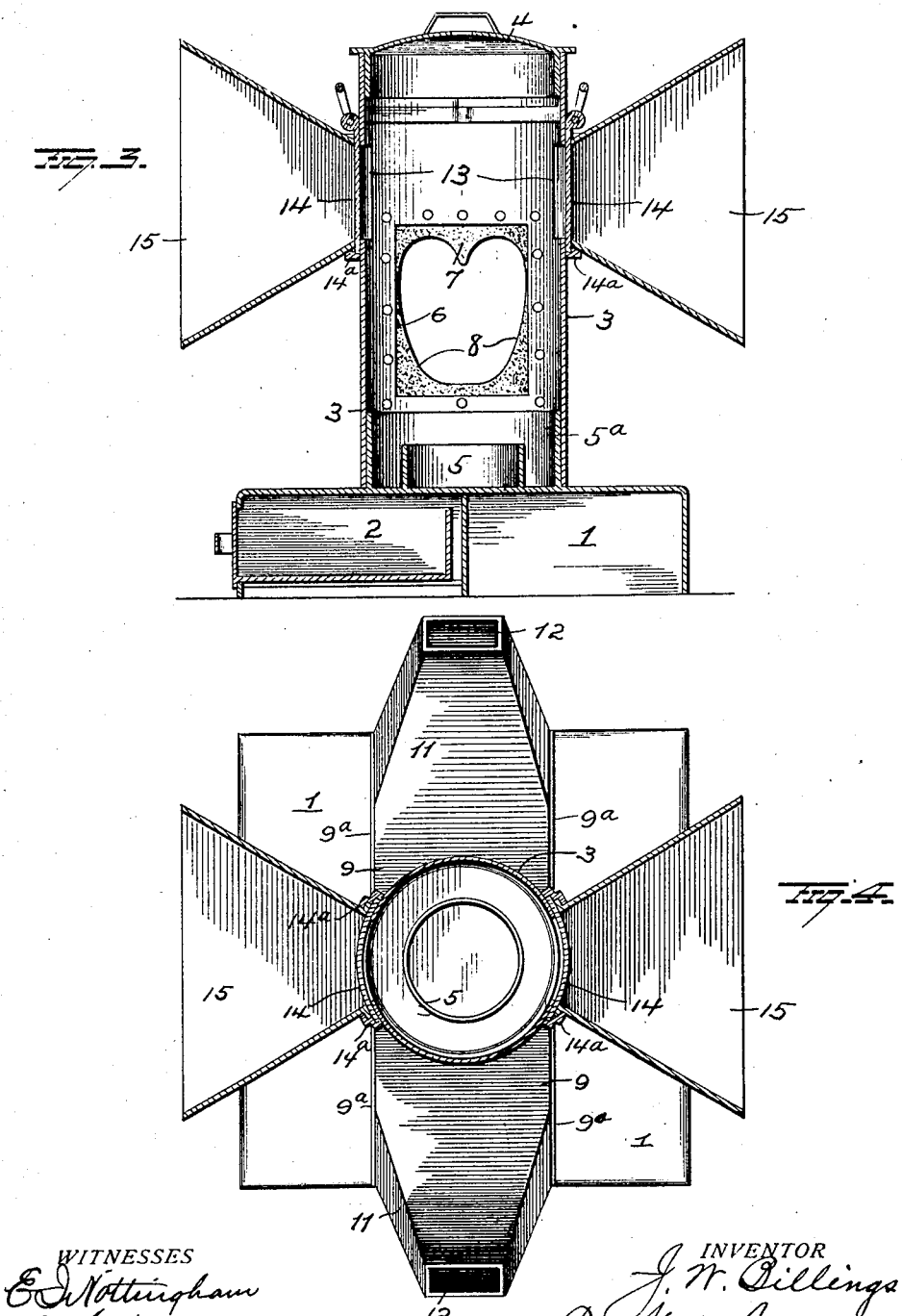

UNITED STATES PATENT OFFICE

JOHN WILSON BILLINGS, OF BEATRICE, NEBRASKA, ASSIGNOR, BY DIRECT AND MESNE ASSIGNMENTS, OF ONE-HALF TO GEORGE M. BILLINGS, OF INDIANAPOLIS, INDIANA, AND ONE-HALF TO ARTHUR JOHN BILLINGS, OF BEATRICE, NEBRASKA.

EGG-TESTER.

No. 892,705.    Specification of Letters Patent.    Patented July 7, 1908.

Application filed March 23, 1907.    Serial No. 364,137.

*To all whom it may concern:*

Be it known that I, JOHN WILSON BILLINGS, of Beatrice, in the county of Gage and State of Nebraska, have invented certain new and useful Improvements in Egg-Testers; and I do hereby declare the following to be a full, clear, and exact description of the invention, such as will enable others skilled in the art to which it appertains to make and use the same.

My invention relates to an improvement in egg testers, the object of the invention being to provide simple and efficient means whereby eggs can be tested without resort to a dark room, such as has heretofore been the usual custom.

A further object is to so construct an egg tester that one or two operators will have free use of both hands to test at least two eggs simultaneously.

A further object is to provide an egg tester capable of use in the day light and in which artificial light of any kind may be employed, or in which sun-light may be utilized instead of artificial light.

With these objects in view the invention consists in certain novel features of construction and combinations and arrangement of parts as hereinafter set forth and pointed out in the claims.

In the accompanying drawings, Figure 1 is a perspective view of an egg tester embodying my improvements. Fig. 2 is a transverse sectional view. Fig. 3 is a similar view taken at right angles to Fig. 2. Fig. 4 is a horizontal sectional view.

1 represents a base which may be provided with a draw 2 and upon this base a shell 3 is removably located and provided at its top with a removable cover 4, having an opening therein for the escape of products of combustion from a lamp or candle located in a suitable holder 5 at the bottom of the shell. In the drawing I have shown the shell 3 as being circular in cross section but it is evident that this shell may be made angular, if desired. A collar 5ᵃ is fixed to the base 1 and enters the shell 3 to assist in holding the latter in place. At diametrically opposite points the shell 3 is provided with openings 6 and over these openings cushions 7 of leather or other material are secured and each cushion presents an opening 8 which is approximately heart-shaped, and affording bearing for two eggs held side by side by an operator in front of the light within the shell. Compartments 9 are formed at each side of the shell 3 and communicate through the heart shaped openings with the interior of the shell. The side walls of these compartments enter between flanges 9ᵃ on the base and these flanges serve to assist in retaining the superstructure in place on the base. The outer ends of the compartments 9 are open for the admittance of the operator's hands. I prefer however to provide a sleeve 10 for each compartment 9 of suitable flexible material for the accommodation of the operator's hands and thus prevent the ingress of light to said compartments. The walls of the compartments 9 are extended upwardly and outwardly to form sight ducts 11, contracted at their free ends and having sight openings 12.

The walls of the shell 3, at right angles to the compartments 9, are made with alined openings 13 which are normally closed, when a lamp or other artificial light is employed, by means of slides 14 held in guideways 14ᵃ on the shell 3. Flaring hoods 15 are attached to the shell 3 and communicate with the openings 13, said hoods being removably supported in the guideways 14ᵃ.

When artificial light is used and has been placed in the tester, as herein before explained, the operator will place two eggs against one of the heart shaped cushions and will then examine the eggs by looking through the adjacent sight duct. When the eggs are thus placed against the cushion they will close the opening between the interior of the shell 3 and the compartment 9 and hence, the sleeves hereinbefore referred to for the use of the operator to exclude light from the compartment 9 are not absolutely essential.

In utilizing sun light instead of artificial light the lamp will be removed; the hoods 15 are placed in position and the slides 14 are opened. The rays of light striking or impinging against the inner walls of the flaring hoods will be directed by the latter into the shell 3 and this light will serve in some cases to permit the eggs to be tested in the manner before explained.

Various slight changes might be made in the details of construction of my invention without departing from the spirit thereof or limiting its scope, and hence I do not wish to restrict myself to the precise details herein described, nor to the use of any particular kind of material of which the device may be made.

Having fully described my invention what I claim as new and desire to secure by Letters-Patent, is:—

1. An egg tester comprising a shell having an opening therein, a cushion secured to the shell and having an approximately heart shaped opening to form bearings for two eggs held side by side, a compartment communicating through said opening with the interior of the shell, a sight duct communicating with said compartment, and means for illuminating the interior of the shell.

2. An egg tester comprising a shell having an opening in its wall, a compartment communicating with said opening, a sight duct communicating with said compartment, said shell having alined openings in its wall, slides for closing said openings, and means for directing rays of light through said alined openings into the shell.

3. An egg tester comprising a shell having openings in diametrically opposite walls, a compartment communicating with each of said openings, a sight duct communicating with each compartment, and light concentrating hoods for directing rays of light into the shell for illuminating the latter.

4. An egg tester comprising a base, a shell provided with lateral compartments communicating with the shell through openings in the latter, said shell and its lateral compartments removably mounted upon the base, means for retaining said shell and compartments in place on the base and said compartments having openings for insertion of the hands of the operator and also having peep holes above said openings.

5. An egg tester comprising a shell provided with a lateral portion, forming a compartment communicating with the shell and having an opening to receive the hands of the operator, said lateral portion having a peep hole, a hood removably attached to the shell at an angle to said lateral portion, and a slide between said hood and the shell.

In testimony whereof, I have signed this specification in the presence of two subscribing witnesses.

JOHN WILSON BILLINGS.

Witnesses:
 LOUIS E. RIESEN,
 H. R. CHAMBERLIN.